March 2, 1926. 1,575,338
J. R. HEWETT
PHOTOGRAPHIC EXPOSURE METER
Filed May 9, 1922 5 Sheets-Sheet 1
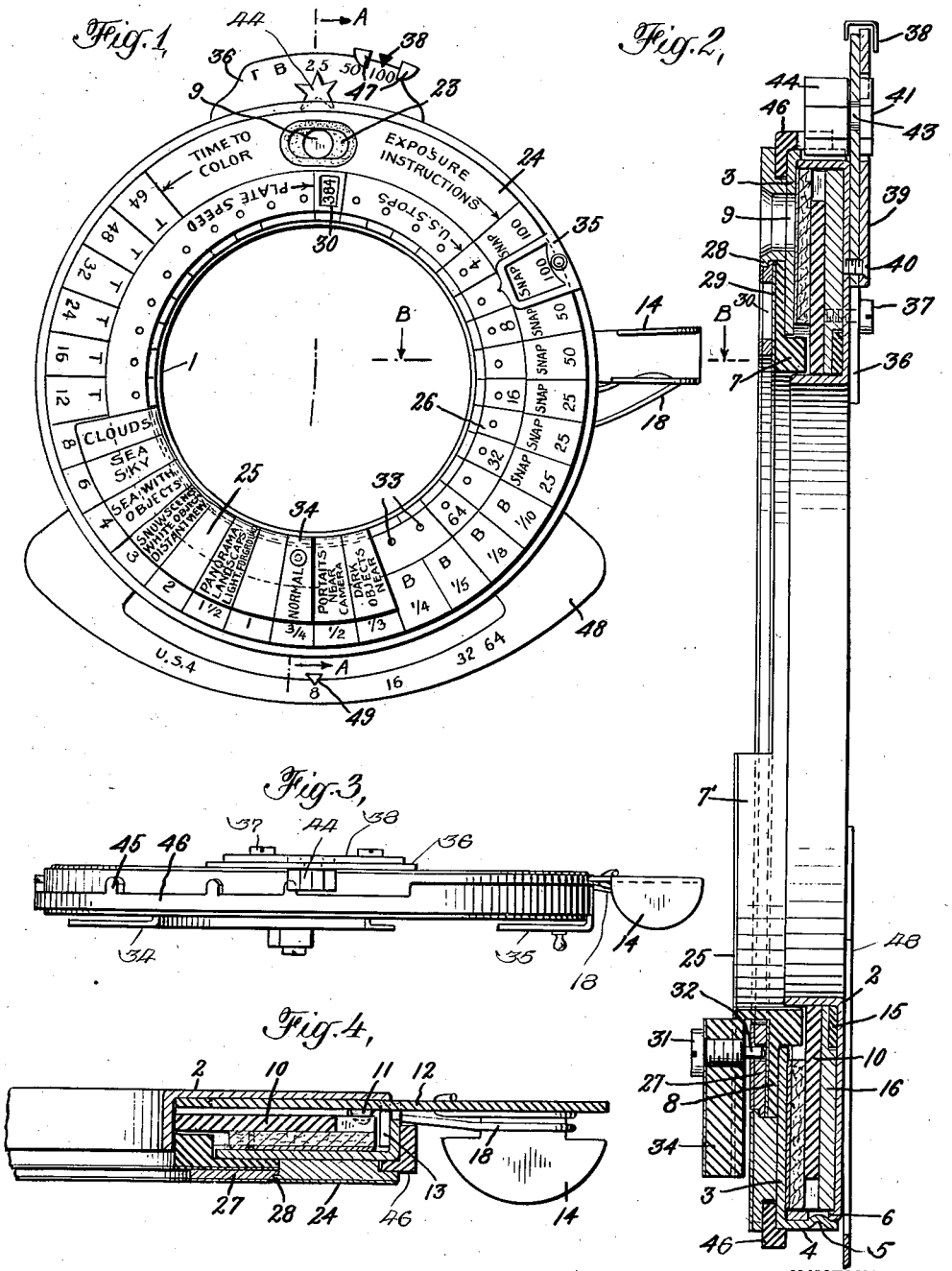
INVENTOR
JOHN R. HEWETT
BY Russell A. Warner
ATTORNEY March 2, 1926.
J. R. HEWETT
1,575,338
PHOTOGRAPHIC EXPOSURE METER
Filed May 9, 1922
5 Sheets-Sheet 2
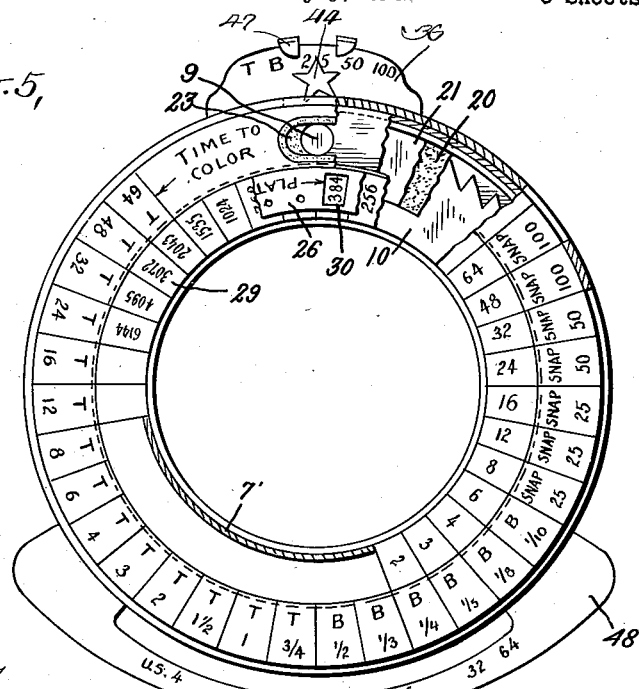
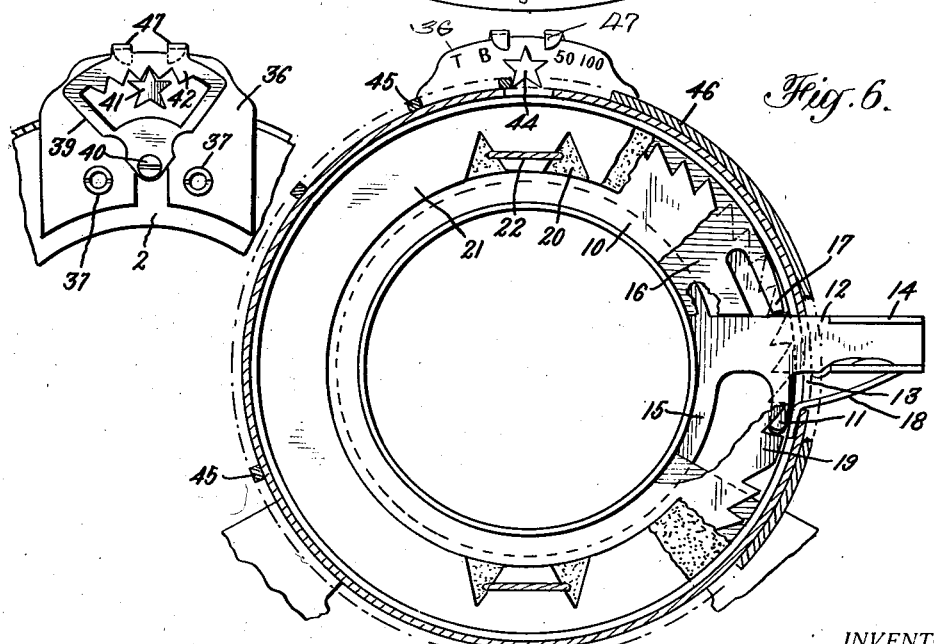
INVENTOR
JOHN R. HEWETT
BY Russell A. Warner
ATTORNEY March 2, 1926.　　　　　　　　　　　　　　　　1,575,338
J. R. HEWETT
PHOTOGRAPHIC EXPOSURE METER
Filed May 9, 1922　　　5 Sheets-Sheet 3
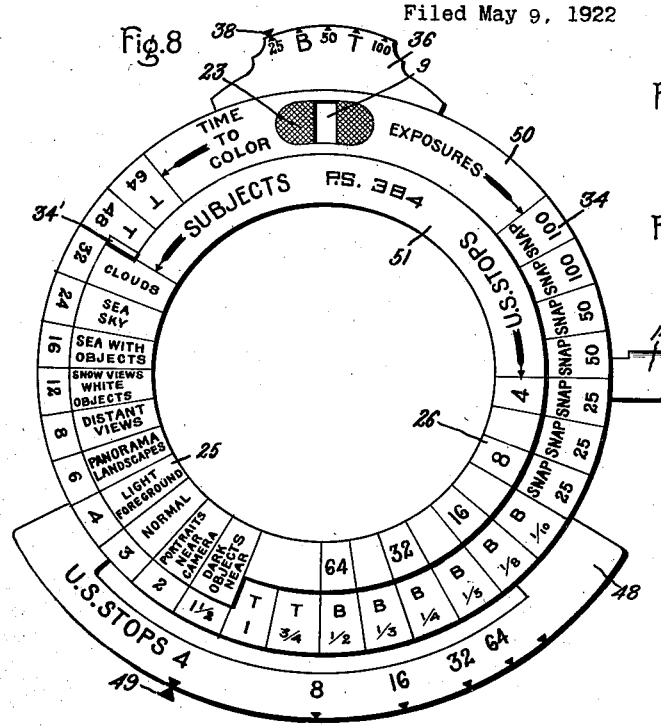
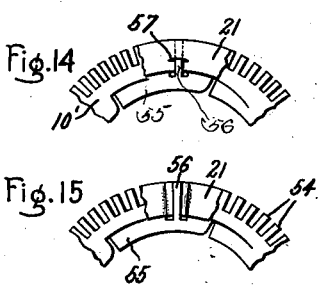
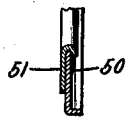
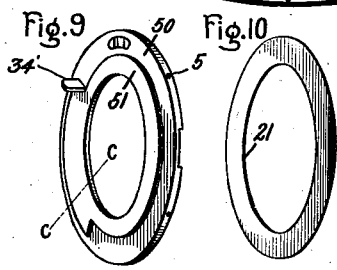
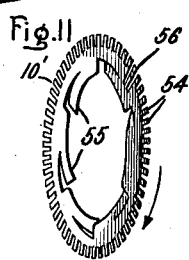
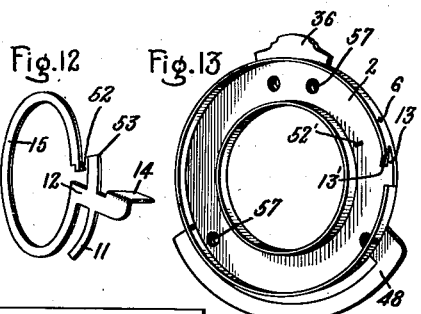
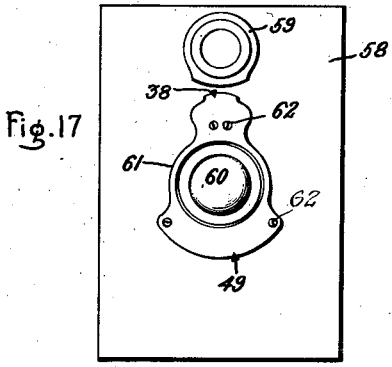
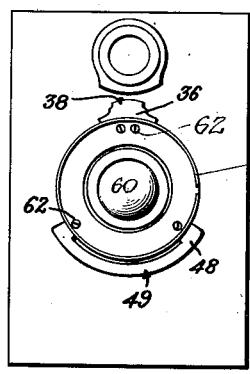
INVENTOR
JOHN R. HEWETT
BY
ATTORNEY March 2, 1926.
J. R. HEWETT
PHOTOGRAPHIC EXPOSURE METER
Filed May 9, 1922
1,575,338
5 Sheets-Sheet 4
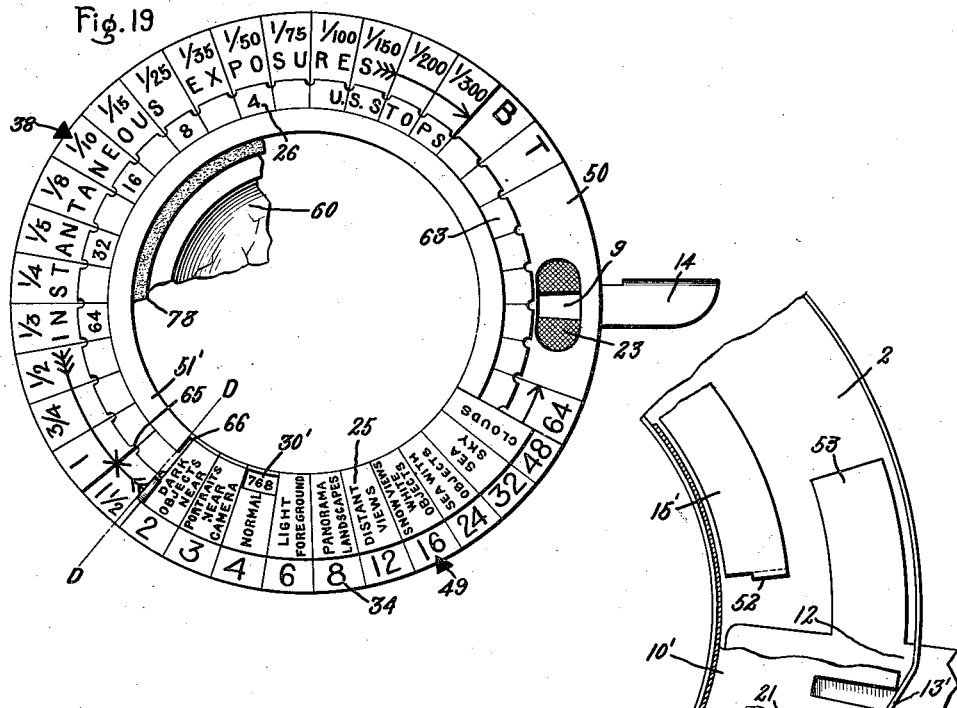
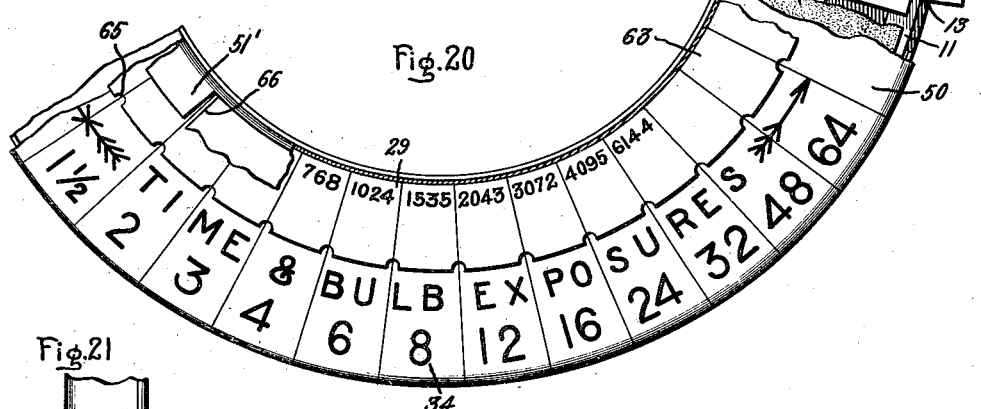
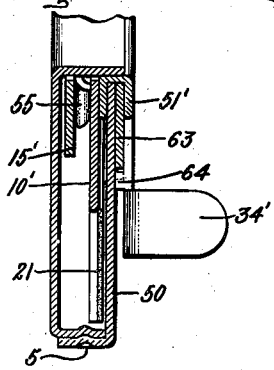
INVENTOR
JOHN R. HEWETT
BY Russell A. Warner
ATTORNEY March 2, 1926.
J. R. HEWETT
1,575,338
PHOTOGRAPHIC EXPOSURE METER
Filed May 9, 1922   5 Sheets-Sheet 5
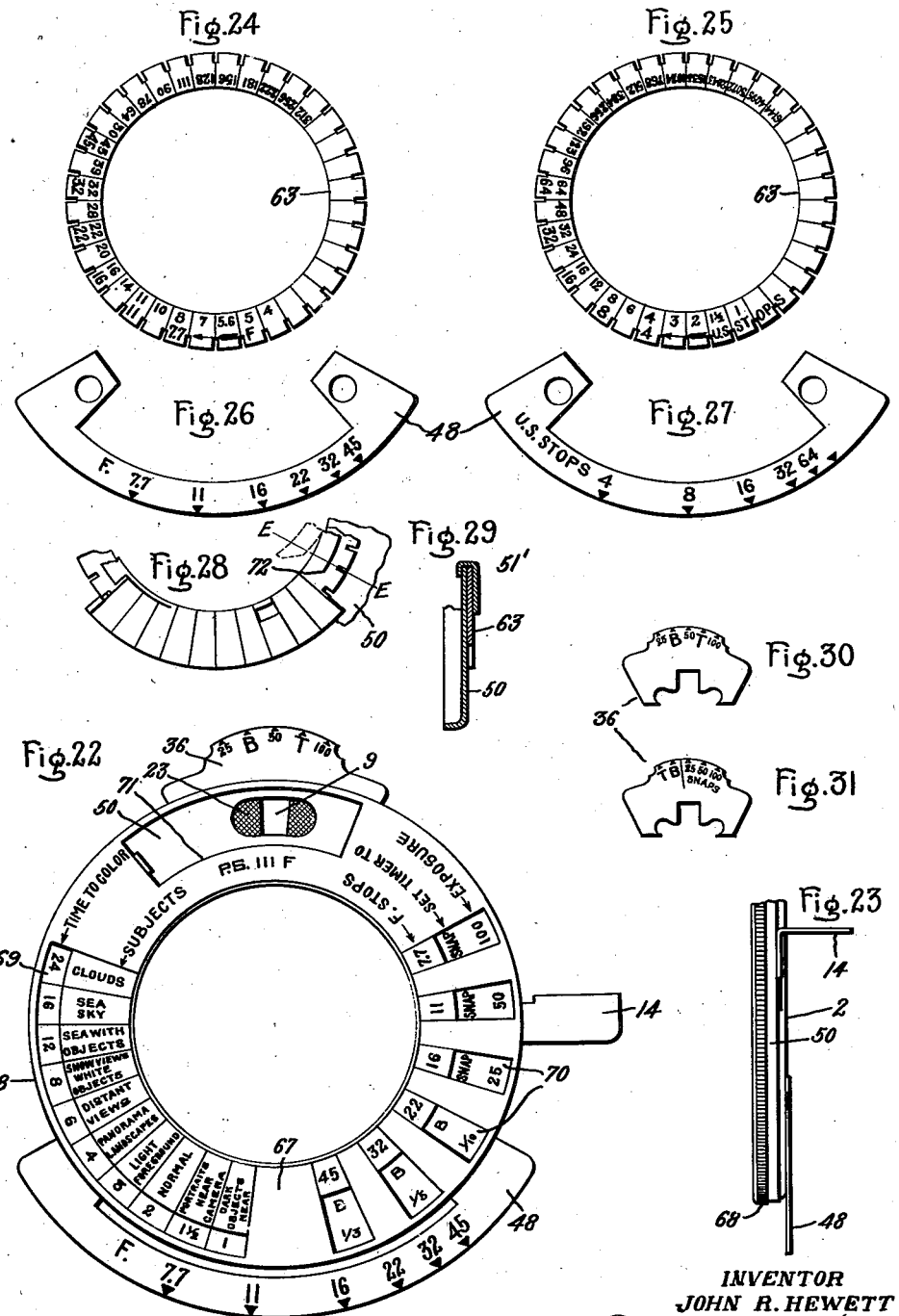
INVENTOR
JOHN R. HEWETT
BY Russell A. Warner
ATTORNEY Patented Mar. 2, 1926.

1,575,338

UNITED STATES PATENT OFFICE.

JOHN R. HEWETT, OF SCHENECTADY, NEW YORK.

PHOTOGRAPHIC EXPOSURE METER.

Application filed May 9, 1922. Serial No. 559,623.

*To all whom it may concern:*

Be it known that I, JOHN R. HEWETT, a subject of the King of Great Britain, residing at Schenectady, in the county of Schenectady, State of New York, have invented certain new and useful Improvements in Photographic Exposure Meters, of which the following is a specification.

My invention relates to exposure meters adapted for use in photography and its primary object is to provide an exposure meter whereby an amateur photographer may by a single adjustment and without calculation determine the correct exposure adjustments of his camera for any given plate speed subject and light value.

A further object is the provision of an improved mechanical construction for exposure meters in general with a view of reducing and simplifying the number of necessary parts and thereby providing a rugged compact and inexpensive exposure meter without sacrificing accuracy and reliability.

A further object is the provision of an exposure meter which may be quickly adapted for use with either the uniform or focal systems of camera markings.

A further object is the provision of an exposure meter wherein only the plate speed and camera adjustments to be used for given conditions are indicated, thereby eliminating the liability of an incorrect setting or reading of the meter.

A further object is the adaptation of my improved meter to cameras in such a way that certain of the meter indications take the place of the usual time and stop markings. Other advantages of my improved exposure meter will appear as the description proceeds.

The most important factor in the art of photography is to obtain the correct exposure of the film or plate. Reliable cameras are now within the means of the vast majority of people. The development of the film or plate after it has been exposed is a comparatively simple and inexpensive matter. Yet photography is expensive and often discouraging to the average person because of the high percentage of films or plates spoiled due to over or under exposure.

There are five essential interdependent conditions to be considered in obtaining correct exposures; namely, 1, light intensities; 2, sensitiveness of the film or plate being used, called plate speed; 3, nature of subject being photographed; 4, amount of opening of camera lens; and 5, the duration of the exposure. Although there have been instruments on the market for years for determining light intensity, yet this value is almost invariably guessed at by the great majority of photographers because the existing types of instruments are relatively expensive and because the photographer after determining the light intensity from such instruments must resort to more or less complicated calculations in order to properly correlate the result with his plate speed, subject and the exposure marking on his camera. By exposure markings, I mean the time of exposure and the amount of opening of the iris diaphragm, the latter being known in the art as "stops". Plate speed is often unknown or ignored and the nature of the subject being photographed is frequently given little, if any, consideration. Thus, the average amateur photographer spoils a great many films or plates because he fails to correctly consider or correlate one or more of the five essential conditions above referred to and becomes more or less of an expert only after long and expensive experiment. By means of my present invention the amateur photographer is enabled to obtain accurate exposures without calculations by a very simple mechanical operation and the inexpensiveness of the improved instrument places it within the means of all photographers.

The features of my present improved exposure meter which I believe to be novel and patentable will be pointed out in the claims appended hereto. The construction and operation of the improved meter together with its adaptability to modern photography will best be understood from the following description taken in conjunction with the accompanying drawings in which Fig. 1 shows a face view of one form of my improved exposure meter in which only a single adjustment is required to determine the correct settings of the camera timing mechanism with a given light value, plate speed, subject and stop; Fig. 2 is a section taken on line A—A of Fig. 1; Fig. 3 is a top view of the meter shown in Fig. 1; Fig. 4 is a section on line B—B of Fig. 1; Fig. 5 is a view of the exposure meter of Fig. 1 with portions of the meter broken away;

Fig. 6 is an interior view showing one form of mechanism for advancing the photo sensitive paper; Fig. 7 is a rear view of a timer pointer operating mechanism which may be used with this type of meter; Fig. 8 is a front view of a meter of simple mechanical construction to be used with a fixed plate speed; Figs. 9 to 13 comprise an exploded view of the parts making up the meter shown in Fig. 8; Figs. 14 and 15 show methods of securing a disc of sensitive paper to the drive used in the meter of Fig. 8; Fig. 16 shows a section on line C—C of Fig. 9; Figs. 17 and 18 explain a preferred method of attaching my meter to a camera; Fig. 19 shows a meter with certain of its scales arranged to take the place of the stop and shutter timer scales of a camera; Fig. 20 shows an enlarged portion of the meter of Fig. 19 with parts broken away for illustrative purposes; Fig. 21 is a section taken on line D—D of Fig. 19; Figs. 22 and 23 illustrate my meter arranged to expose only certain portions of the meter scales. This meter will be referred to as the shrouded type, and Figs. 24 to 31 elucidate interchangeable features applicable to my meter.

In the drawings like parts are designated by the same reference numerals. Referring now more in particular to Figs. 1 to 7 of the drawings, 1 indicates a casing preferably in a form adapted to fit about the lens tube of a camera and to be secured to the camera in any convenient manner so as to not interfere with the proper operation thereof. It is convenient to make the casing in an annular form comprising a rear channel section 2 and a front section 3 having an angular outer edge 4 adapted to fit about and be secured to the rear section 2 in any convenient manner such as by a plurality of spring lugs 5 fitting into corresponding recesses 6. The inner edge of the ring section 3 does not extend to the inner wall of the section 2 but is separated therefrom so as to allow the insertion of a relatively movable ring 7 having a marginal flange 8 at the outer edge. Within the casing thus formed there is arranged a mechanism for supporting and moving a sensitive paper past an observation opening 9 provided in the front section 3 of the casing in order that the length of time required to print such paper to the proper depth under prevailing light conditions may be determined in a well understood manner. In the modification shown in Figs. 1 to 7, this mechanism constitutes a ratchet ring 10 arranged within the casing so as to be rotatable on the inner wall of the section 2 by means of a pawl 11, best shown in Fig. 6. The pawl 11 is integral with an arm 12 extending radially through an opening 13 in the casing and terminating in a bent over finger piece 14 for the purpose of manipulating the same to advance the ratchet wheel.

The inner end of the arm 12 is secured to or is integral with a hub 15 rotatably mounted on the inner wall of section 2. This hub is held in place against the rear wall of section 2 by a stepped ring 16 having a portion thereof cut away adjacent the opening 13 to make room for the arm 12 and its movement. The arm is limited in its movement by the width of the opening 13 which is so adjusted that the ratchet wheel can only be advanced one notch at a time. A finger 17 is provided integral with the split ring 16 with its end slightly bent toward the ratchet wheel in a position to engage the notches in the periphery of the ratchet wheel 10 and to prevent any backward movement thereof when the arm 12 and pawl 11 are retracted. A spring 18 is provided in connection with arm 12 to retract the same to normal position after it has been moved to advance the ratchet wheel. It will be noticed that a notch is omitted at 19 in the periphery of the ratchet wheel 10 and it will be evident that when this portion comes opposite the pawl 11, the wheel cannot be further advanced thereby until it has been otherwise moved past this point. Thus, by the mechanism just described, the ratchet wheel may be advanced by a step-by-step movement in one direction only for substantially one revolution after which its operation will cease until the portion 19 has been moved past pawl 11 the purpose of which will now be explained.

The front of the ring 10 carries a pad 20 secured thereto in any suitable manner. Upon the front side of pad 20 there is adapted to be secured one or more annular shaped rings of photo-sensitive paper 21. The paper is suitably held to the pad such as by thread loops 22 so as to be positively driven thereby when the ratchet wheel 10 together with pad 20 is advanced. The casing wherein the sensitive paper is contained is light tight except opposite the opening 9. Adjacent the opening 9 is a background 23 tinted to the same color that the sensitive paper will take when exposed to light for the time necessary for correct photographic exposures under prevailing light conditions. The notches in the ratchet wheel are so spaced as to bring consecutive portions of the paper adjacent the opening in a manner to utilize the paper to the best advantage. That is to say, the paper will be moved just far enough each time to bring an unexposed portion opposite the opening. When the paper has been moved around so as to expose substantially its entire circumference, portion 19 of the wheel 10 will come opposite pawl 11 and the mechanism will cease to function indicating to the operator without further investigation that a fresh piece of paper is required. The operator will then open the case in a subdued light or dark room, tear off the exposed paper strip, thus uncovering an unexposed piece, advance the ratchet wheel one notch and close the case. When the paper strips have all been used up a fresh supply will be inserted. The position to which the ratchet wheel should be reset is shown in Fig. 6. This particular mechanism is designed for fifty exposures for each revolution of the ratchet wheel. It will be evident to those skilled in the art that the mechanism just described may be used with a watch or other timing device and provides a convenient and inexpensive means of determining the light value. By a little practice some people can judge time sufficiently accurately to use the meter without a timing device.

The colored field or background 23 mentioned above is provided in a depression on a front dial ring 24. This ring is secured to section 3 of the casing in any convenient manner and is provided with an opening in the center of the field of color coinciding with the opening 9 in the front section 3 of the casing. Thus the sensitive paper may conveniently be viewed from the front of the meter through the openings 9 thus formed and compared with the colored background 23 arranged about the opening. The time for the sensitive paper to change to the color of the background 23 after an unexposed portion is moved in front of opening 9 is noted and for the purpose of correlating the result thus obtained with plate speed, subject and camera adjustments I provide a scale, one end of which is marked "Time to color" on the front of ring 24 as clearly shown in Fig. 1. The other end of the scale is marked "Exposure instructions." In the present illustration this scale is graduated from 64 seconds to 1/100 seconds in a sufficient number of steps to accurately take care of all light conditions and exposures liable to be met with in ordinary photography. In practice it will be found that the part of the time to color and exposure scale from 1 to 64 will be the only portion used for light values as the sensitive paper will never color to the standard tint or background 23 in less than one second. This entire scale will be used for exposures. When the paper takes less than a minute to color all the exposures are in seconds or fractions thereof, but should the paper take longer than a minute to color the time to color numerals will indicate minutes or fractions thereof and the exposures will be in minutes and fractions thereof. It will be noted that below 1/10 seconds this scale is not marked in the fractional form, but is marked "25" "50" and "100" indicating 1/25, 1/50 and 1/100 seconds respectively and is thus marked so as to correspond with the form of exposure time markings commonly found on cameras. Each graduation of this scale is also marked with one of the following indications: "T" "B" or "Snap" corresponding to the usual camera exposure time markings, indicating respectively "Time exposure," "Bulb exposure" and "Snap shot." The significance of these markings will be clear when the complete operation of the meter is hereinafter explained.

Cooperating with the dial ring 24 is a subject scale 25 and a stop scale 26. The subject scale 25 is mounted on an overhung sector of ring 7 best shown in Figs. 1 and 2. The overhanging portion is connected to ring 7 by the axial sector 7' of ring 7. The stop scale 26 is mounted on a ring 27 secured in place on the front of the meter by the overhanging rib 28 of the ring 24 and passes beneath the overhung sector of ring 7 which carries the subject scale as clearly shown in Figs. 1 and 2. Both rings 7 and 27 are adjustable with respect to the meter casing and to each other and are held in place by the overhanging rib 28 on ring 24. The marginal flange 8 of ring 7 carries a plate speed scale 29 (see Fig. 5) which is covered up by ring 27 except at an opening 30 therein. The stop dial ring 27 and ring 7 are normally secured together by a screw 31 passing through a threaded hole in the overhung sector of ring 7 and provided with a reduced end portion 32 adapted to fit into any one of a number of holes 33 in ring 27. These holes are so positioned with respect to the opening 30 that rings 7 and 27 may be secured together with any plate speed indication appearing in opening 30. As will be explained more fully below, this is the manner of adjusting the meter for the plate speed being used.

It will be noticed in Figs. 1 and 2 that the portion of the subject scale marked "Normal" has a raised portion 34. This is used both as a distinct indication of the normal subject position most used and as a handle for adjusting the scale relative to the time scale dial 24. If desired, the handle may be made integral with its supporting piece as indicated in Fig. 2.

The various scales of the meter may, if desired, be carved, etched, stamped or otherwise marked in the material of which the meter is made or they may be engraved or otherwise marked on any surface such as celluloid which is suitably secured to the supporting rings. In the present modification, I have indicated the scales as being carried by a thin covering such as celluloid, suitably secured to the respective supporting rings (see Figs. 2 and 4). The rings and other parts of the meter are preferably made of brass or other non-oxidizable metal or material. The stop scale and plate speed scale are preferably labeled accordingly as indicated in Fig. 1. It will be understood that the various scales have been carefully compiled and are so associated with each other in the improved meter as to give accurate results when correlated in the manner now to be explained.

The meter may be used either on or off of a camera. Assuming it to be mounted about the lens tube of a camera and it is desired to take a snow scene using a film with a plate speed of "384". The stop scale is adjusted relative to the plate speed scale until "384" appears in opening 30. Handle 14 is pressed to bring an unexposed portion of the sensitive paper 21 opposite opening 9 and the time required to color this portion to correspond with the background 23 is noted. Let us say the time was three seconds. "Snow scene" on the subject scale is then set opposite "3" on the time to color scale. This is the adjustment of the meter shown in Fig. 1. The photographer is now ready to adjust the opening of the iris diaphragm and the timing device of the shutter on the camera. Referring to the exposure instructions, he notes from the stop and exposure scales that if he uses stop "8", he should take a snap shot with the shutter timer set at "50" or if he prefers to use stop "16", he should set his shutter timer at "25". It will thus be evident that after determining the light value, only one simple meter adjustment is necessary and the results are immediately indicated in terms of the camera markings without any further meter adjustments or calculations. Thus, after determining the light value only a few seconds are required to take the picture. This is important because if several adjustments of the meter were necessary or if there are calculations to make, the light value might have changed sufficiently in the meantime to spoil the picture. I have found that my improved exposure meter as thus used gives accurate results.

If desirable, a movable indicator 35 may be provided to more clearly set off the exposure instructions to be used and if the meter is mounted on a camera, this indicator may be connected to the shutter timing mechanism in a manner to automatically set the latter to the correct value as determined and indicated on the meter. In the modification shown in Figs. 1 and 2, the meter is provided with a plate 36 secured to the back of the casing in any convenient manner such as by screws 37, best shown in Fig. 7. This plate takes the place of and carries the same indications as the usual plate found on cameras relative to which the shutter timer mechanism is adjusted in setting the same. In the present illustration, this plate carries on its front side the indications "T", "B", "25", "50" and "100" respectively indicating time, bulb, 1/25, 1/50 and 1/100 seconds. It will be understood that the pointer 38 which is carried by the shutter timing mechanism of the camera (not shown) may be moved over these indications and in so doing, move the timing mechanism accordingly. In order that this pointer may be moved by and in accordance with the indicator 35 on the meter, I provide a motion transmission mechanism between them. In the present illustration, this mechanism comprises a fan shaped lever 39 pivoted on the back of plate 36 at 40, a spur gear 41 meshing with a toothed sector 42 on said lever, a shaft 43, and a second spur gear 44 which meshes with spaced gear teeth 45 contained on a ring 46 upon which the indicator 35 is mounted. The two spur gears are secured to shaft 43 which passes through and has a bearing in plate 36. The ring 46 is adjustably mounted about the front of the meter casing and is held in place by the dial ring 24. The manner in which the teeth 45 engage spur gear 44 is clearly indicated in Figs. 3 and 6. The lever 39 is provided with a pair of spaced lugs 47 adapted to extend on either side and engage the shutter timer pointer 38 so as to move the same in accordance with the movement of indicator 35 and the intermediate motion transmitting mechanism. The teeth 45 on ring 46 are so positioned and spaced that the pointer will be moved from one indication to another in accordance with the movement and indications appearing within the indicator 35. Thus, in Fig. 1, lugs 47 are on either side of "100" corresponding to the indication given by 35. When indicator 35 is moved opposite "50" on the meter, lugs 47 will move to enclose "50" on the shutter timer scale and in so doing, will move the pointer 38 and the shutter timing mechanism accordingly.

Suitably secured to the back of the meter is a plate 48. This plate carries a stop scale corresponding to the usual stop scale found on most cameras relative to which a pointer 49 carried by the mechanism for opening and closing the iris diaphragm of the camera (not shown) is moved. One manner of attaching the meter to the camera so as to correctly position plates 36 and 48 will be explained in connection with Figs. 17 and 18.

Referring now more in particular to Figs. 8 to 16 inclusive, which exemplify an improved and simplified mechanical construction of a meter embodying my invention; Fig. 8 shows the front view of such a meter with the scales arranged for a single plate speed. Film manufacturers make what is known as standard films; that is, films with a standard plate speed. For example, one manufacturer may make a standard film which has a plate speed of 384. Many photographers prefer to use some such standard film because they are more readily obtainable and give consistent results. The meter shown in Fig. 8 is provided with scales graduated for a plate speed of 384. I do not wish to limit this embodiment to any particular plate speed, however, because it will readily be understood that the meter might be designed for any other definite plate speed. Thus, if I desired to design the meter for a plate speed of 768, the stop scale as shown in Fig. 8 would be moved two spaces to the right relative to the subject scale so that stop 64 would appear where stop 32 now is. Likewise, if the meter were designed for a plate speed of 512, stop 64 would appear in the space between 64 and 32. For those photographers who prefer to use a standard film, this type of meter is preferable because the meter can be made with a less number of parts and is therefore simpler and less expensive. In the meter of Fig. 8 the plate speed scale and supporting ring are therefore eliminated; the plate speed for which the meter is designed will preferably be marked thereon in some conspicuous place and in the present illustration, I have marked the plate speed between the subject and stop scales thus— "P. S. 384". The meter scales 24, 25 and 26 are otherwise arranged as in Fig. 1 and the meter is used in the same manner. The meter of Fig. 8 might otherwise be constructed as in Fig. 1. However, I have preferred to show in this embodiment a simpler construction in many other respects. For example, I have eliminated the exposure indicator 35 and the connecting mechanism for moving the shutter timer. Instead of the handle 34 of Fig. 1, I utilize an upturned end of the subject sector as indicated at 34'. Instead of providing celluloid scales as in Fig. 1, I marked the scales directly on the metal rings 50 and 51 which in this instance form the front of the casing. These two parts are adjustably secured together by turning the inner edge of ring 51 over the inner edge of ring 50 as indicated in Fig. 16 which represents a section taken on line C—C of Fig. 9. The back portion of the casing 2 is substantially similar to that shown in Fig. 1. In the present modification, the front section 50 and the rear section 2 have outer flanges extending toward each other adapted to fit one within the other and fasten with a snap action. The front section preferably fits over the back section and they are secured together by a plurality of inwardly extending projections 5 on section 50 fitting into a plurality of corresponding recesses 6 in section 2. Section 2 has an inner flange which extends to and abuts against the overturned edge of ring 51 in a manner indicated in Fig. 21, thus closing the casing. Other means of fastening the casing together will be evident to those skilled in the art and I therefore do not wish to be limited to any particular method.

Within the casing thus formed, I provide a simplified mechanism for supporting and moving a disc of sensitive paper past the opening 9 in cover plate 50 where the paper may be compared with the colored field 23 for determining light values. In this modification the mechanism consists of only two parts, a ratchet wheel 10', shown in Fig. 11, and a member for advancing this ratchet wheel, shown in Fig. 12. These two parts are preferably stamped spring material. The advancing member, shown in Fig. 12, comprises a split hub section 15' adapted to fit about the inner wall of section 2 of the casing with its flat surface against the rear wall and with an overturned end 52 fitting into a hole 52' in said rear wall. A radial arm 12 integral with the hub is positioned to pass through an opening 13 in the outer wall of the casing where it is bent into a finger piece 14. This is best shown in Figs. 12 and 20. The arm 12 is provided with angular extensions 53 and 11 positioned to come just within the casing. The latter is bent away from the rear wall to form a pawl used for advancing the ratchet wheel and the extension 53 is provided merely to assist in keeping the member in place when so used. The ratchet wheel 10' is provided with a plurality of outer radial teeth 54 and a plurality of springs 55 formed by rearwardly bent segments cut in the inner edge of the wheel. The ratchet wheel is adapted to lie on top of the hub 15' with the teeth 54 in a position to be engaged and advanced by pawl 11 (see Fig. 20). It will be noticed that one tooth 56 is cut to a greater depth than the others. I utilize this tooth for securing the disc of sensitive paper 21 shown in Fig. 10 to the ratchet wheel in a manner indicated in Figs. 14 and 15. In Fig. 14 the paper is provided with a slit 57 through which tooth 56 is passed with the outer periphery of the paper uppermost. It is this portion of the paper which is exposed to the opening 9 and it will thus be evident that when so arranged the complete periphery of the paper may be utilized. If it is desired to obtain an indication when one-quarter of the sensitive disc remains unexposed, the paper may be secured to the ratchet wheel by passing the entire width beneath tooth 56 as indicated in Fig. 15. When this portion passes opening 9 it may serve to notify the user that a certain amount of the paper disc has been exposed. For example, if a fresh disc was started with tooth 56 opposite finger piece 14, the operator will know that three-quarters of the paper has been exposed when tooth 56 appears opposite opening 9. When the fastening shown in Fig. 14 is used, it may be desirable to provide one or more deep teeth such as 56, arranged at equally distant points about the periphery for securing the paper. I have found however that one such tooth is sufficient when the method of Fig. 15 is employed.

When the parts are assembled and the casing closed, springs 55 will be under slight compression thereby pressing wheel 10 and the sensitive paper disc 21 closely against the inner wall of the front cover piece 50. This effectively keeps any light from reaching the sensitive paper except opposite opening 9. It will be noticed that the ends of springs 55 extend in the direction opposite to that in which the ratchet wheel is advanced by pawl 11. They are so positioned to prevent any backward rotation of the wheel when arm 12 and pawl 11 are retracted. They act in a sense like ratchet pawls on hub 50. However, they are sufficient in number so that they accomplish this purpose without it being necessary to notch or otherwise roughen the outer surface of hub 15. The overhanging tongue 13' shown in Fig. 20 may be bent in so as to slip over the end of the teeth 54 in the form of a pawl and thus prevent any backward rotation of the ratchet wheel 10'. Springs 55 also prevent the fastening finger 52 of hub 15' from getting out of hole 52'. The inner end 52 of hub 15' is fastened to the back wall of the casing at 52'. This hub being of spring material is adapted to be constrained when the finger piece 14 is pressed downward to advance the ratchet wheel so that it comes back to normal position by itself when the finger piece is released. Therefore the use of a separate spring for that purpose is unnecessary.

In the modification of Fig. 8 the meter is provided with a shutter timer scale plate 36 and a stop scale plate 48 which may be secured to the rear of the casing in any suitable manner. To assemble the meter parts shown in Figs. 9 to 13 inclusive, hub 12 is inserted in the rear section of the casing with finger 52 in hole 52' and with arm 12 passing through the slotted opening 13. Next an unexposed disc of paper 21 is secured to the ratchet wheel as shown in Figs. 14 or 15 with its sensitive side uppermost and the ratchet wheel laid in hub 15' with the springs 55 against the hub and with the paper 21 uppermost. Tooth 56 will preferably be set just past ratchet 11. Cover 50 is then snapped in place. It will, of course, be necessary to perform these operations in a dark room so as not to expose the sensitive paper.

If the meter is to be used on a camera, rear plate 2 will in this modification be secured to the camera before the parts are assembled. Fig. 17 represents the front of the usual form of camera showing the camera box 58, the view finder 59, lens tube 60, shutter pointer 38, stop pointer 49 and the open plate 61 which carry shutter timer and stop scales similar to those shown in Fig. 8. Fig. 18 shows the same type of camera with the plate 61 removed and the rear section of my improved meter casing in place. The same screw holes and screws 62 are used in both instances, the screws passing through the accurately positioned holes 57 of the rear section of the meter casing bringing shutter time scale 36 and stop scale 48 in the correct position to cooperate with their respective pointers 38 and 49. This same method of securing the meter to the camera may be used with any of the other modifications herein described. The position of the screw holes 57 will be modified to correspond with the position of the screw holes in various types of cameras. It will thus be evident that the meter may be readily and accurately secured to existing types of cameras. The meter not only adds beauty to the camera but is in exactly the correct position to be used to the best advantage.

The use of this meter may be briefly explained as follows: It will be understood that the camera will be loaded with a film having a plate speed corresponding to the plate speed of the meter, in this instance, "384". The camera is placed in position and finger piece 14 is pressed downward thus advancing a fresh portion of the sensitive paper opposite opening 9. The time to color this paper to correspond with color field 23 is noted. Let us assume it took three seconds and that it is desired to photograph a normal subject. "Normal" on the subject scale is moved opposite "3" on the time to color scale. This adjustment is shown in Fig. 8. From the exposure instructions, it will be noticed that we may use, for example, stop 16 with a bulb exposure of 1/8 seconds or stop 64 with a bulb exposure of 1/2 seconds, or if a snap shot is preferable, we may use either stop 4 or 8 with 1/25 seconds exposure which is indicated as "25" to correspond with the customary markings on the plate 36. The shutter timer 38 and stop pointers 49 are adjusted accordingly and the picture taken. There is no guesswork or experience necessary or required to obtain good results with the use of this meter and the photographer may be assured, even though it is his first picture, that it will be a good one and thus the common practice of taking several exposures of a given subject with the hope of getting one good is no longer required.

In Figs. 19 and 20, I have illustrated my improved meter with the scales arranged in such a manner that the time to color and exposure scales thereof may also serve as the setting scales for the stop and shutter timer pointers respectively of a camera. The shutter timer scale shown on this meter is calculated to be used in connection with the more expensive high speed cameras. Thus the snap shot or instantaneous exposure scale shown at the top of the meter is graduated in small steps from one second down to 1/300 seconds. The meter as illustrated is adjustable for different plate speeds, the plate speed scale 29 and stop scale 26 of the meter being carried on a ring 63 which is adjustably mounted with respect to the subject scale 25 carried by ring 51'. The ring 51' is similar to ring 51 of Fig. 8 with the exception that it extends out from the front cover 50 of the casing a sufficient distance to make room for ring 63 as clearly illustrated in Fig. 21 which represents a section taken on line D—D of Fig. 19. An opening 30' is provided in the "normal" subject space of the ring 51' opposite the plate speed scale 29 on ring 63. It will be noticed that the plate speed scale is engraved on the inner edge and the stop scale 26 on the outer edge of ring 63 so that the plate speed scale is completely covered by the narrow front portion of ring 51' except at the opening 30'. This avoids confusion and mistakes, yet provides a simple and compact structure. In order to securely hold the rings 51' and 63 in any desired plate speed adjustment, I provide a bent down finger 64 integral with ring 51' adjacent the bent up handle 34' which finger is adapted to fit into any one of a number of notches 65 cut in the outer edge of ring 63. These notches are so spaced as to bring the various plate speed indications opposite opening 30' when the finger 64 is opposite the respective notches. The ring 51 is made of any material which may be slightly sprung and is provided with a sufficient cut at 66 to allow the finger 64 to be sprung out of a notch when it is desired to move rings 51' and 63 relative to each other to adjust for a different plate speed.

In Fig. 20, I have shown an enlarged portion of Fig. 19 with parts broken away to show part of the plate speed scale and the interior of the meter. The mechanism for supporting and advancing the sensitive paper 21 is exactly similar to that described in connection with Figs. 11 and 12. The exposure opening 9 and color field 23 are placed at the side as shown in Fig. 19 in order to make room for the rearranged scales and the scales are reversed on this instrument from that shown in Figs. 1 and 8. The back section 2 of the casing is similar to that shown in Fig. 13. The shutter timer and stop scale plates, however, are omitted from the meter of Fig. 19 because as previously mentioned, the shutter timer scale and the time to color scale of the meter itself take their places. Thus, in Fig. 19 the shutter timer pointer 38, which will be connected to the shutter timer adjusting mechanism of the camera, and the stop pointer 49, which will be connected to the mechanism for adjusting the iris diaphragm of the camera, are respectively mounted adjacent the shutter timer and time to color scales of the meter itself. I have not thought it necessary to illustrate the connections between the pointers 38 and 49 and their respective mechanisms on the camera as it will be evident to those skilled in the art that the proper motion transmitting cams may be provided therefor to make the adjustments of the camera correspond to the scales indications of the meter. The meter itself may be mounted about the lens tube 60 of the camera as previously described.

To use the meter of Fig. 19 the plate speed number corresponding to the film or plate being used is made to appear in opening 30'. Finger piece 14 is pressed downward to bring an unexposed portion of the sensitive paper opposite opening 9 and the time for it to change to the color of the field 23 is noted. The subject scale 25 is then adjusted relative to the time scale 34 until the subject being photographed, as selected on the subject scale, is opposite the time required to color the sensitive paper. Stop pointer 49 is then set opposite the number on the time scale which corresponds to the number of the stop desired and shutter timer pointer 38 is moved opposite this number on the stop scale 26 for all instantaneous exposures. In Fig. 19 the meter is adjusted and set to take a snap shot with a plate speed of "768", time to color "4" seconds, subject "normal", stop "16" and exposure of "1/10" seconds. Likewise, the same setting and adjustments might be used for a plate speed of "768" to photograph a "distant view" where the time to color requires "12" seconds or one might use stop "8" and an instantaneous exposure of "1/25" seconds in which case pointers 49 and 38 would be moved opposite "8" and "1/25" respectively on the time scale. When the light value is poor or the plate speed of the film being used is of a low value it will sometimes be desirable to use a time or bulb exposure, particularly if the subject being photographed is of such a nature as to require a comparatively large amount of light. For example, let us assume the following conditions: plate speed "768", time to color "48" seconds, and subject "dark object near". In this case the subject and time scales should be adjusted to make "dark object near" appear opposite "48". This adjustment will bring stop numbers 16, 32 and 64 opposite time numbers 2, 4 and 8 respectively, indicating that if any one of these stops are used, the exposure should be a "time" or "bulb" exposure. Thus, for example, shutter timer pointer 38 will be moved opposite "T" and stop pointer 49 opposite "32" on the time scale and the exposure given 4 seconds. In order to assist the photographer in determining whether he should use an instantaneous exposure or a time exposure under any given condition, I have divided the time scale into two parts, one marked "Instantaneous exposures" and the other marked "Time and bulb exposures".

In Fig. 22 I show a front view and in Fig. 23 a partial side view of a meter designed for a single plate speed as in Fig. 8, but having the stop and subject scales carried by a plate 67 which extends over the front of the meter and terminates in a bent over flange 68 surrounding the meter. The flange 68 is preferably provided with a milled surface as shown in Fig. 23 in order to provide a gripping surface by which the plate 67 may be turned in adjusting the meter. Opposite the subject scale the plate 67 is cut away at 69 to expose the "time to color" scale on ring 50. Opposite the stop numbers thereon plate 67 is provided with openings 70 in order that the exposure instructions carried on ring 50 may be correlated with the stop scale. An opening 71 is also provided in the upper sector of plate 67 in order to expose the opening 9 and color field 23 of the light measuring mechanism. The name of each scale is preferably indicated opposite thereto on plate 67 as illustrated. The other parts of the meter may be otherwise mechanically constructed as in Fig. 8. In the shrouded type of meter shown in Fig. 22 all unnecessary portions of the time to color and exposure scales are covered up by the plate 67 so that for any adjustment of the plate 67 relative to ring 50 confusion in reading the meter is prevented and thus the liability to make mistakes with this type is reduced to a minimum.

There are two different systems of plate speed and stop markings in common use. The system used with rectilinear lenses is called the "uniform system" and is designated thus, "U S". The other system called the "focal" system and designated by the letter "F" is used with astigmatic lenses. The scales of the meter illustrated in Fig. 22 are designed for the focal system. In this instance the plate speed is 111 corresponding to approximately "768" in the uniform system. The operation of the meter is similar to those previously described.

In view of the two different systems of markings above referred to, it becomes important to provide an exposure meter which may be readily adapted to either system. Figs. 24 to 29 inclusive illustrate a simple and convenient way of accomplishing this object with one form of my meter without increasing the number of necessary parts. Figs. 24 and 25 represent opposite sides of a ring mechanically similar to that shown at 63 of Fig. 19. The ring carries stop and plate speed scales corresponding to the focal system on one side as illustrated in Fig. 24 and carries stop and plate speed scales corresponding to the uniform system on the opposite side as illustrated in Fig. 25. Figs. 26 and 27 illustrate opposite sides of a stop scale plate mechanically similar to that shown at 48 in previous figures. One side of this plate carries a stop scale corresponding to the focal system as shown in Fig. 26 and the opposite side carries a stop scale corresponding to the uniform system as illustrated in Fig. 27.

It will now be evident that a meter provided with such parts can be adapted for either the focal or uniform system by merely reversing the sides of these parts. For example, the ring 51 of Fig. 8 could be made in two parts similar to rings 51' and 63 of Fig. 19 and these two parts might be relatively adjustable for different plate speeds or not, as desired. Then, by assembling the parts with the focal system of marking uppermost, the meter becomes a "focal" system meter and by reversing ring 63 and plate 48 the meter becomes a "uniform system" meter. The plate 48 may be readily reversed as will be clear from an inspection of Figs. 13 and 18. A convenient method of making the ring 63 readily reversible with respect to the other parts of the meter and more particularly with respect to ring 51' is illustrated in Fig. 28 which represents portions of rings 63 and 51' when assembled. Fig. 29 represents an enlarged section through line E—E of Fig. 28. Ring 51' is split at 72 so that one portion may be sprung inwardly as illustrated in dotted lines. This operation will release a sufficient sector of ring 63 from the bent over portion of ring 51 to permit the removal of the former. Ring 63 may then be turned over and parts assembled.

Cameras are manufactured with various different shutter timer adjusting mechanisms; two styles being commonly used are shown in Figs. 30 and 31. By making the shutter timer scale plate 36 of my meter reversible and providing these two systems of markings on opposite sides thereof, the same meter may be mounted on and used with a camera having either type of shutter timer adjusting mechanism.

It will be evident from an inspection of the various figures that all of the meter parts shown in Figs. 9 to 30 inclusive may be stamped from sheet metal. In general, the various features described are interchangeable. The meter need not necessarily be mounted on a camera in order to be useful.

Although I have particularly described my meter as being secured to a camera by screws through the back portion, I do not wish to be limited to this particular fastening means. I might simply use a rubber gasket such as illustrated at 73, Fig. 19, for this purpose which would obviate the necessity of opening the meter casing when securing it to the camera. When the meter is secured to the camera by a rubber gasket, it will be preferable to leave the usual stop and shutter timer plates on the camera and omit them from the meter. It will furthermore be observed that the mechanism for determining the light value and the arrangement of the scales for determining exposure instructions represent separate and distinct advances in the art which might be embodied in separate instruments without departing from certain aspects of my invention. The greatest utility is obtained however by combining them in a single instrument as hereinbefore described. The finished surface of the meter may be made to correspond to the finish of the metal parts of the camera. I have found nickel-plated brass to be a very satisfactory combination for this purpose.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. An exposure meter having cooperating "time to color," "subject," "stop" and "exposure" scales, characterized by a correlating mechanism for said scales such that, for a given plate speed, correct exposure instructions may be obtained for any given subject and light value by a single operation of said mechanism.

2. An exposure meter having cooperating "time to color," "subject," "stop" and "exposure" scales shaped so as to be mounted about the lens tube of a camera and so arranged on a correlating mechanism that, for a given plate speed, correct exposure instructions may be obtained for any given subject and light value by a single adjustment of said mechanism.

3. An exposure meter comprising a pair of annular dials movable with respect to each other, "subject" and "stop" scales on one of said dials, "time to color" and "exposure" time scales on the other dial, and means whereby said dials may be rotated relatively to each other for determining exposure instructions for a given plate speed and for any subject and light value.

4. An exposure meter, cooperating dials on said meter, complete data on said dials for determining exposure instructions for a given plate speed and for any subject and light value, said data being arranged in such a manner that the exposure instructions may be obtained by a single adjustment of one of said dials.

5. An exposure meter having cooperating "time to color," "subject," "stop" and "exposure" scales so arranged that for a given light value, plate speed and subject, correct exposure instructions may be determined for all stops by a single adjustment.

6. An exposure meter comprising means for determining light values and other means for correlating a given light value, plate speed and subject in a way to indicate correct exposure instructions for all openings of the lens.

7. In combination with a camera, an exposure meter adapted to fit about the lens tube of said camera, a stationary annular dial graduated in exposure times on the front cover of said casing, a movable dial graduated in stop numbers and subjects cooperating with said stationary dial, said dials comprising a correlating mechanism for determining the camera adjustments and a movable lever for adjusting the exposure time of said camera to indicate on said exposure time dial the time for which the exposure mechanism is set.

8. An exposure meter adapted to fit about the lens tube of a camera provided with means for determining light values and carrying complete data for determining exposure instructions, said data being so arranged on a pair of cooperating dials that correct exposure instructions for a given light value, subject and plate speed may be indicated for all openings of the lens by a single adjustment of one of said dials.

9. In an exposure meter means for simultaneously correlating light value, plate speed and subject to determine the correct setting of a camera shutter timer for any lens opening.

10. An exposure meter comprising an annular casing shaped so as to fit about the lens tube of a camera, means in said casing for measuring the prevailing light value and means on said casing for determining camera exposure instructions for any given light value.

11. An exposure meter having cooperating "light value" and "subject" scales arranged as a correlating mechanism for determining exposure instructions, one of said scales being provided with an opening, a plate speed scale beneath said last mentioned scale and adjustable with respect thereto, the relation of said adjustable scales being such that the plate speed for which the instrument is correlated appears in said opening.

12. In an exposure meter cooperating "light value" and "subject" scales arranged as a correlating mechanism for determining exposure instructions, a member carrying stop and plate speed scales beneath said subject scale, and means for adjustably securing said subject scale and member together, said subject scale being provided with an opening in alinement with the plate speed scale on said member, said scales being so related that the plate speed for which the instrument is correlated appears in said opening.

13. An exposure meter of the sensitive paper type constructed in the form of an annular casing and arranged to fit closely about the lens tube of a camera.

14. An explosive meter comprising an annular casing, an annular cover therefor, complete data on the exterior of said cover for determining exposure instructions under prevailing light values without calculations, and means within said casing for obtaining the prevailing light value.

15. An explosive meter comprising a casing having a cover provided with data for determining exposure instructions and a mechanism comprising only two sheet metal integral parts contained within said casing for supporting and moving a sensitive paper past an opening in said cover.

16. A flat annular casing adapted to fit about the lens tube of a camera, said casing being provided with an opening in the front cover thereof and a two-part mechanism contained within said casing for supporting and moving a disc of sensitive paper past said opening by a step-by-step movement.

17. An exposure meter comprising an annular casing having cooperating front and back portions, the front portion comprising cooperating dials carrying complete data for determining exposure instructions, a toothed wheel for supporting a disc of sensitive paper within said casing and a spring hub member provided with a ratchet finger cooperating with the teeth in said wheel and a handle extending through an outer wall of said casing for moving said wheel with a step-by-step movement.

18. An annular casing adapted to fit about the lens tube of a camera, a two-part mechanism within said casing for supporting and moving a strip of sensitive paper therein, said mechanism comprising a toothed wheel and a split spring hub encircling the inner wall of said casing, one end of said hub being secured to the rear wall of said casing and the other end having a radial finger piece extending through the outer wall of said casing and a ratchet finger integral with said radial finger piece positioned to engage the teeth in said wheel.

19. An annular exposure meter casing having a cover, an opening in said cover, and annular sheet metal stamping in said casing for driving a strip of sensitive paper past said opening, said stamping having teeth in its outer periphery and having its inner periphery cut in such a way as to form a plurality of axially displaced spring pawls which are adapted to prevent a backward rotation of said stamping and to cause the latter to hold the sensitive paper snugly against the front cover of said casing and a ratchet device in said casing for advancing said stamping.

20. In an exposure meter, a disc of sensitive paper, a toothed wheel for advancing said paper, said paper being secured in driving relation with said wheel by passing a portion thereof beneath one of the teeth in said wheel.

21. An exposure meter casing, a disc of sensitive paper therein, a toothed wheel for advancing said paper and to which said paper is secured by passing a portion thereof beneath a tooth in said wheel, an exposure opening in said casing past which said paper is advanced the tooth beneath which said paper is passed serving as an indication of the length of unexposed paper when opposite said opening.

22. An exposure meter adapted to fit about the lens tube of a camera and carrying scales of data for determining exposure instructions, one of said scales being positioned and graduated to serve as the shutter timer scale and stop scale of the camera.

23. In combination, a camera, an exposure meter comprising an annular casing secured about the lens tube of said camera, a pair of cooperating dials forming the cover of said meter and carrying complete data for determining exposure instructions with the prevailing light value, one of said dials serving as the setting scale for the shutter timer and stop pointers of said camera and means within said casing for obtaining the prevailing light value.

24. An exposure meter provided with cooperating dials carrying data for correlating light values with subjects to determine exposure instructions for a given plate speed, characterized by the fact that said meter may be adapted for either the focal or uniform system of camera marking by reversing one of said dials.

25. An exposure meter provided with cooperating dials carrying complete data for determining camera exposure instructions and a camera stop scale plate attached to said meter, said meter being adapted to fit about the lens tube of the camera with said plate in position to cooperate with the usual camera stop pointer, characterized by the fact that said meter may be adapted for use with either the focal or uniform system of camera markings by reversing one of said dials and said plate.

26. An exposure meter comprising cooperating dials carrying data for correlating light values with subjects to determine camera exposure instructions for a given plate speed characterized by the fact that only the data susceptible of use with a given setting is exposed.

27. In a camera, a dial carrying data relative to which the stop and shutter timer pointers of the camera are moved in adjusting the lens opening and timing mechanism of the camera respectively and a compound dial cooperating with said first mentioned dial for determining the positions at which said pointers should be set for any combination of plate speed, subject and light value.

28. An exposure meter comprising a casing, a cover for said casing having an opening, means within said casing for determining the prevailing light value when exposed to said opening, complete data on the exterior of said cover for determining camera exposure instructions, under all photographic conditions, said data being arranged on cooperating dials forming a correlating mechanism whereby camera adjustments for any given set of conditions may be determined without calculations.

29. An exposure meter having one continuous scale for time to color and time to expose and a cooperating scale for subjects, stops and plate speed arranged in such a way that the correct exposure time for given conditions may be detemined by a single movement of one of said scales.

In witness whereof, I have hereunto set my hand this eighth day of May, 1922.

JOHN R. HEWETT.